US012750097B2

(12) United States Patent
Chang et al.

(10) Patent No.: US 12,750,097 B2
(45) Date of Patent: Sep. 29, 2026

(54) APPARATUS AND METHOD FOR MULTI-CHANNEL DATA SIGNAL PROCESSING BASED ON BROADBAND TRANSMISSION AND RECEPTION

(71) Applicant: AGENCY FOR DEFENSE DEVELOPMENT, Daejeon (KR)

(72) Inventors: Jaewon Chang, Daejeon (KR); Cheol Sun Park, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 92 days.

(21) Appl. No.: 18/974,931

(22) Filed: Dec. 10, 2024

(65) Prior Publication Data

US 2026/0095212 A1 Apr. 2, 2026

(30) Foreign Application Priority Data

Sep. 30, 2024 (KR) ........................ 10-2024-0133292

(51) Int. Cl.
*H04B 7/02* (2018.01)
*H04B 7/0413* (2017.01)

(52) U.S. Cl.
CPC .................................. *H04B 7/0413* (2013.01)

(58) Field of Classification Search
CPC .................................................... H04B 7/0413
USPC ........................................................ 375/267
See application file for complete search history.

(56) References Cited

U.S. PATENT DOCUMENTS

2008/0115038 A1* 5/2008 Kee .................. H03M 13/2975 714/760
2010/0106944 A1* 4/2010 Symes .................... G06F 9/382 712/E9.028
2024/0340063 A1* 10/2024 Abotabl ................. H04B 7/066

FOREIGN PATENT DOCUMENTS

JP H09246977 A 9/1997
JP 3345396 B2 11/2002
KR 101809960 B1 1/2018

* cited by examiner

*Primary Examiner* — Helene E Tayong
(74) *Attorney, Agent, or Firm* — Dilworth & Barrese, LLP.; Michael J. Musella, Esq.

(57) ABSTRACT

Disclosed is a data signal processing apparatus including: a seed number generator generating a seed number by using node index bit information allocated to each of multiple distributed devices and corrected data bit information of a broadband receiver mounted on each of the multiple distributed devices; and a data interleaver defining an input start point of an interleaving block by using the seed number, sequentially inputting bit information of input data into the interleaving block in a first direction from the input start point, and sequentially reading bit information from the interleaving block in a second direction and outputting output data.

18 Claims, 16 Drawing Sheets

| MCS | 0 | 1 | 2 | 3 | 4 | 5 | 6 | 7 | 8 | 9 | 10 | 11 | 12 | 13 | 15 |
|---|---|---|---|---|---|---|---|---|---|---|---|---|---|---|---|
| Modulation | BPSK | QPSK | | 16-QAM | | 64-QAM | | | 256-QAM | | 1024-QAM | | 4096-QAM | | BPSK-DCM |
| Coding Rate | 1/2 | 1/2 | 3/4 | 1/2 | 3/4 | 2/3 | 3/4 | 5/6 | 3/4 | 5/6 | 3/4 | 5/6 | 3/4 | 5/6 | 1/2 |

< MCS table >

1024-QAM 2048-QAM 4096-QAM

< High order modulation >

< 16 channel resource allocation using 320 MHz bandwidth>

Node index bits: 101100 (6-bit for more than 32 channels)
Calibration data bits: 111101010 (9-bit calibration data for resolutions of less than 1°)
IF data bits: 1110 1011 0101 0011 ...

APPARATUS AND METHOD FOR MULTI-CHANNEL DATA SIGNAL PROCESSING BASED ON BROADBAND TRANSMISSION AND RECEPTION

CROSS-REFERENCE TO RELATED APPLICATION

This application claims priority to and the benefit of Korean Patent Application No. 10-2024-0133292 filed in the Korean Intellectual Property Office on Sep. 30, 2024, the entire contents of which are incorporated herein by reference.

BACKGROUND

(a) Field

The present disclosure relates to an apparatus and a method for multi-channel data signal processing based on broadband transmission and reception, and more particularly, to an apparatus and a method for multi-channel data signal processing based on broadband transmission and reception for independent wireless resource allocation and security enhancement of multi-channel data which may be applied when physically distributed devices simultaneously transmit and receive mass data simultaneously through a wireless channel.

(b) Description of the Related Art

A wireless communication system is a technology that delivers information using radio waves, and there are various forms such as mobile communication, Wi-Fi, and Bluetooth. Signal transmission and reception between a base station and a terminal transmits voice, data, and images in real time, which allows users to maintain connectivity regardless of a location. In recent years, the introduction of 5G technology enables high data transmission speed and low-latency communication, and new application fields such as the Internet of Things (IoT) and autonomous vehicles are being actively developed.

In the wireless communication system, various technologies are applied for broadband mass data transmission and reception. Main techniques include orthogonal frequency division multiplexing (OFDM) and multiple input multiple output (MIMO). The OFDM divides a frequency into multiple orthogonal subcarriers to overcome multiple path fading and has a strong characteristic for frequency selective fading. The MIMO transmits multiple data streams simultaneously through multiple transmitting and receiving antennas to increase a transmission speed and improve a signal to noise ratio (SNR). Besides, beamforming technology is used to maximize transmission efficiency by concentrating signals in a specific direction through antenna arrangements. The technologies greatly enhance the efficiency and stability of data transmission in 4G and 5G networks, and play an important role in various application fields such as real-time streaming, high resolution video transmission, and autonomous vehicle communication.

Various technologies are used as a method for improving a data transmission and reception channel quality. First, the multiple input multiple output (MIMO) technique transmits data through multiple paths using multiple transmitting and receiving antennas to increase a transmission speed and a signal quality. Second, beamforming concentrates signals in a specific direction by using antenna arrangements to reduce signal interference and maximize transmission efficiency. Third, an adaptive modulation and coding (AMC) technique optimizes a data transmission rate and reliability by controlling a modulation scheme and encoding according to a channel state. Fourth, a signal strength and a signal quality can be enhanced by relaying a signal though a relay technology.

There are various techniques for reducing a data bit error rate or a frame error rate in a time-varying wireless channel and a frequency selective channel. First, there is adaptive modulation and coding (AMC) which monitors channel state information in real time, and thus adjusts a transmission parameter. Second, a technology to diversify signals in time and frequency domains is used. For example, through time diversity and frequency diversity, signals are transmitted to various paths to reduce errors. Third, an error can be detected and modified from data received through forward error correction (FEC) coding. Fourth, reliability can be increased by retransmitting data with an error through a hybrid automatic repeat request (HARQ) technology. The techniques effectively reduce data transmission errors due to volatility of the wireless channel and frequency selective characteristics.

In the wireless communication system, a data rearrangement technique plays a key role in enhancing reliability and efficiency of data transmission. Data rearrangement is a process in which a transmitter changes a sequence of data and a receiver restores the changed sequence to an original sequence before transmitting a data packet. This technique is used primarily for minimizing the transmission errors by utilizing time and frequency diversities. For example, a technique such as block interleaving increases a restoration possibility at the receiver even though continuous data errors occur by rearranging data blocks.

Further, the data rearrangement maximizes the transmission efficiency by reducing a correlation of a signal in an MIMO system which distributes and transmits data through various paths. Besides, rearranged data can be dynamically adjusted according to the channel state, which enables stable data transmission even in a highly volatile wireless environment. Such a rearrangement technique serves as an important factor which increases the reliability and the efficiency of the data transmission in a wireless network.

SUMMARY

Embodiments of the present invention attempts to provide an apparatus and a method for multi-channel data signal processing based on broadband transmission and reception, which can independently allocate radio resources and enhance security for broadband multi-channel data transmission and reception between multiple distributed devices capable of wireless signal transmission and reception.

An exemplary embodiment of the present disclosure provides a data signal processing apparatus including: a seed number generator generating a seed number by using node index bit information allocated to each of multiple distributed devices and corrected data bit information of a broadband receiver mounted on each of the multiple distributed devices; and a data interleaver defining an input start point of an interleaving block by using the seed number, sequentially inputting bit information of input data into the interleaving block in a first direction from the input start point, and sequentially reading bit information from the interleaving block and outputting output data.

The node index bit information may determine a generative polynomial of a shift register for randomizing bit information of the seed number.

The seed number generator may obtain an output bit value by inputting the corrected data bit information into the generative polynomial of the shift register determined by the node index bit information, and select, as the seed number, significant bit information computed when an input value of the corrected data bit information is used in all states of the shift register among the output bit values.

The data interleaver may sequentially input bit information of the input data from the input start point in a horizontal direction corresponding to a turn direction in a 2D interleaving block.

The data interleaver may sequentially read bit information from a 0-th block in a vertical direction orthogonal to the turn direction in the 2D interleaving block to output the output data.

The data interleaver may sequentially input the bit information of the input data into each interleaving block with a block of a turn corresponding to the seed number as the input start point in all multiple 2D interleaving blocks included in a 3D interleaving block.

The data interleaver may divide the multiple 2D interleaving blocks into multiple groups, and rearrange bit information by reading bits from 2D interleaving blocks in each group one bit by one bit to output the output data.

Another exemplary embodiment of the present disclosure provides a data signal processing apparatus performing data rearrangement in a multiple access wireless link of a wireless communication system based on broadband transmission and reception, which includes a plurality of slave nodes and one master node, including: a seed number generator randomizing bit information of a seed number by using node index bit information and corrected data bit information of each node; and a data interleaver sequentially inputting bit information of input data into the interleaving block in a first direction, and outputting output data generated by rearranging the input data by reading bit information from the interleaving block in a second direction.

The data interleaver may define, as an input start point, a block of a turn corresponding to bit information of the seed number in the interleaving block, and input the bit information of the input data into the interleaving block.

Yet another exemplary embodiment of the present disclosure provides a data signal processing method by a data signal processing apparatus performing data rearrangement in a multiple access wireless link of a wireless communication system based on broadband transmission and reception, including: generating a seed number by using node index bit information allocated to each of multiple distributed devices and corrected data bit information of a broadband receiver mounted on each of the multiple distributed devices; defining an input start point of an interleaving block by using the seed number; sequentially inputting bit information of input data into the interleaving block in a first direction from the input start point; and sequentially reading bit information from the interleaving block in a second direction, and outputting output data.

The node index bit information may determine a generative polynomial of a shift register for randomizing bit information of the seed number.

An output bit value may be obtained by inputting the corrected data bit information into the generative polynomial of the shift register determined by the node index bit information, and significant bit information computed when an input value of the corrected data bit information is used in all states of the shift register among the output bit values may be selected as the seed number.

Bit information of the input data may be sequentially input from the input start point in a horizontal direction corresponding to a turn direction in a 2D interleaving block.

Bit information may be sequentially read from a 0-th block in a vertical direction orthogonal to the turn direction in the 2D interleaving block to output the output data.

The bit information of the input data may be sequentially input into each interleaving block with a block of a turn corresponding to the seed number as the input start point in all multiple 2D interleaving blocks included in a 3D interleaving block.

The multiple 2D interleaving blocks may be divided into multiple groups, and bit information may be rearranged by reading bits from 2D interleaving blocks in each group one bit by one bit to output the output data.

Still yet another exemplary embodiment of the present disclosure provides a data signal processing method by a data signal processing apparatus performing data rearrangement in a multiple access wireless link of a wireless communication system based on broadband transmission and reception, which includes a plurality of slave nodes and one master node, including: randomizing bit information of a seed number by using node index bit information and corrected data bit information of each node; sequentially inputting bit information of input data into the interleaving block in a first direction; and sequentially outputting output data generated by rearranging the input data by reading bit information from the interleaving block in a second direction.

A block of a turn corresponding to bit information of the seed number may be defined as an input start point in the interleaving block, and the bit information of the input data may be input into the interleaving block.

According to an exemplary embodiment of the present disclosure, an apparatus and a method for multi-channel data signal processing based on broadband transmission and reception can independently allocate radio resources and enhance security upon distributed wireless data transmission and reception using multiple distributed devices capable of wireless signal transmission and reception.

According to an exemplary embodiment of the present disclosure, an apparatus and a method for multi-channel data signal processing based on broadband transmission and reception, a seed number used for data interleaving is randomized by using node index bit information allocated to distributed devices and corrected data bit information of a transceiver, and an input start point of an interleaving block is defined by using the randomized seed number to apply data interleaving, thereby enabling transmitting and receiving mass data for each of multiple nodes.

DETAILED DESCRIPTION

Figure 1:
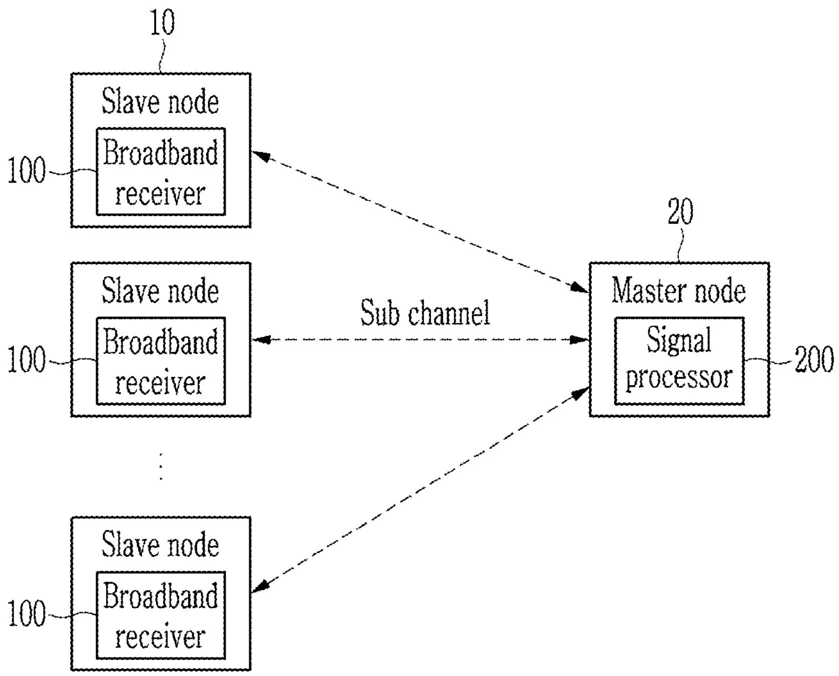
FIG. 1 is a block diagram illustrating a wireless communication system based on broadband transmission and reception between multiple distributed devices capable of wireless signal transmission and reception according to an exemplary embodiment of the present disclosure.

Hereinafter, an exemplary embodiment of the present disclosure will be described more fully hereinafter with reference to the accompanying drawings so as to be easily implemented by those skilled in the art. The present disclosure may be implemented in various different forms and is not limited to exemplary embodiments described herein.

A part irrelevant to the description will be omitted to clearly describe the present disclosure, and the same elements will be designated by the same reference numerals throughout the specification.

In addition, unless explicitly described to the contrary, the word “comprise”, and variations such as “comprises” or “comprising”, will be understood to imply the inclusion of stated elements but not the exclusion of any other elements. Hereinafter, referring to FIGS. 1 to 5, a system for multi-channel data signal processing based on broadband transmission and reception between multiple distributed devices capable of wireless signal transmission and reception according to an exemplary embodiment of the present disclosure will be described.

FIG. 1 is a block diagram illustrating a wireless communication system based on broadband transmission and reception between multiple distributed devices capable of wireless signal transmission and reception according to an exemplary embodiment of the present disclosure.

Referring to FIG. 1, the wireless communication system based on broadband transmission and reception may include a plurality of slave nodes 10 and one master node 20 capable of wireless signal transmission and reception. The master node 20 may be one of multiple distributed devices, and the slave node 10 may be the other one among the multiple distributed devices. The master node 20 may form multiple access wireless links for mass data transmission and reception with the plurality of slave nodes 10 through a plurality of sub channels.

As an example, the master node 20 may be one drone among cluster drones, and the plurality of slave nodes 10 may be the remaining drones among the cluster drones. The master node 20 may be selected according to a control command of ground operation equipment, and one drone among the cluster drones may be selected as the master node 20 by considering a combination which may deliver data transmitted from the plurality of slave nodes 10 with maximum transmission efficiency. The master node 20 may be selected by using positional information of distributed nodes (drones), a signal to noise radio (SNR), a transmission bandwidth, or a modulation and coding scheme (MCS) level used in a wireless link.

As an exemplary embodiment in which the plurality of slave nodes 10 and one master node 20 implement a beamforming technique, each of the plurality of slave nodes 10 may include a broadband receiver 100, and the master node 20 may include a signal processor 200.

Figure 2:
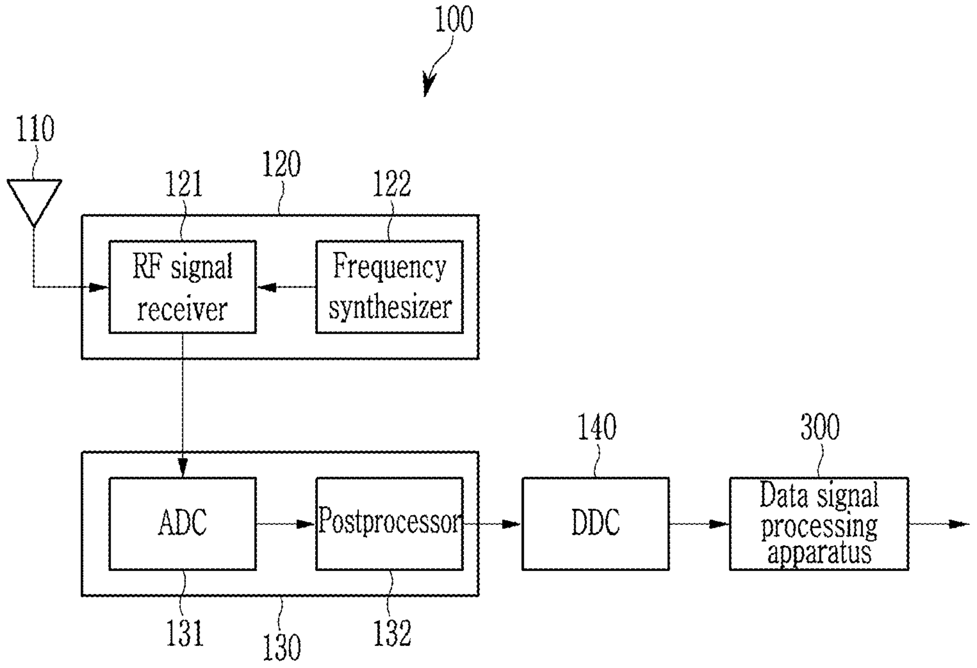
FIG. 2 is a block diagram illustrating a broadband receiver according to an embodiment of the present disclosure.

FIG. 2 is a block diagram illustrating a broadband receiver according to an embodiment of the present disclosure.

Referring to FIG. 2, the broadband receiver 100 included in the slave node in a device group for implementing the beamforming technique by multiple distributed devices is described.

The broadband receiver 100 may include a receiving antenna 110, a frequency down converter 120, an ADC interface 130, and a digital down converter 140.

The receiving antenna 110 may receive an RF signal to be received by applying the beamforming technique.

The frequency down converter 120 may perform frequency down-conversion for the received RF signal. To this end, the frequency down converter 120 may include an RF signal receiver 121 and a frequency synthesizer 122. The frequency synthesizer 122 may generate a synchronization signal for frequency down-conversion, and provide the generated synchronization signal to the RF signal receiver 121, and the RF signal receiver 121 may receive the synchronization signal, and down-convert the received RF signal into a baseband IF signal.

The ADC interface 130 may perform an analog-digital conversion process for digital signal processing. To this end, the ADC interface 130 may include an ADC latch 131 and a post processor 132. The ADC latch 131 may convert an IF signal which is an analog signal into a digital signal, and the post processor 132 may extract only a desired specific signal by performing narrowband filtering for an IF data signal converted into the digital signal.

The digital down converter 140 may convert the signal processed through the ADC interface 130 into a signal of a DC center frequency, and then convert the signal of the DC center frequency into an in-phase/quadrature (I/Q) data signal, and output the I/Q data signal.

The I/Q data signal may be data-rearranged (data signal processed) through a data signal processing apparatus 300 according to an exemplary embodiment of the present disclosure, and data-rearranged output data may be transmitted to the master node 20 through a sub channel. That is, the data signal processing apparatus 300 may perform data rearrangement in a multiple access wireless link of the wireless communication system based on broadband transmission and reception. A detailed description of the data signal processing apparatus 300 is made below with reference to FIG. 6.

Figure 3:
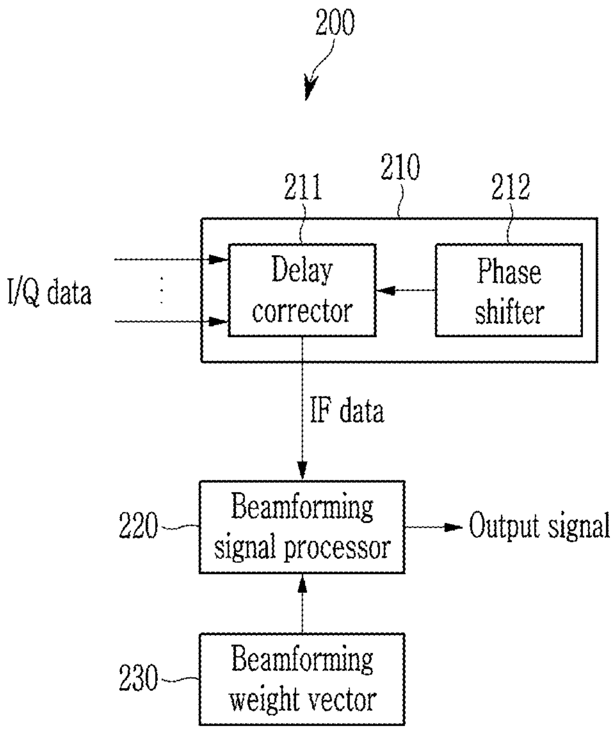
FIG. 3 is a block diagram illustrating a beamforming signal processor according to an exemplary embodiment of the present disclosure.

FIG. 3 is a block diagram illustrating a beamforming signal processor according to an exemplary embodiment of the present disclosure.

Referring to FIG. 3, the signal processor 200 included in the maser node in the device group for implementing the beamforming technique with multiple distributed devices is described.

The signal processor 200 may include a time-phase corrector 210, a beamforming signal processor 220, and a beamforming weight vector 230.

The time-phase corrector 210 may receive the I/Q data signal processed by the plurality of broadband receivers 100 mounted on the plurality of slave nodes 10 through a wireless multiplexing channels (a plurality of sub channels). The time-phase corrector 210 may correct a time (phase) error generated in the broadband receiver 100 of each of the plurality of slave nodes 10. To this end, the time-phase corrector 210 may include a latency corrector 211 and a phase shifter 212. The phase shifter 212 may input corrected data control for correcting an integer/decimal unit time delay into the delay corrector 211, and the delay corrector 211 may perform time (phase) correction by receiving the corrected data control.

The beamforming weight vector 230 may store a beamforming weight vector value required for beamforming, and the beamforming signal processor 220 may perform beamforming signal processing by applying the beamforming weight vector value to IF data for each slave node 10 which is time (phase)-corrected.

Figure 4:
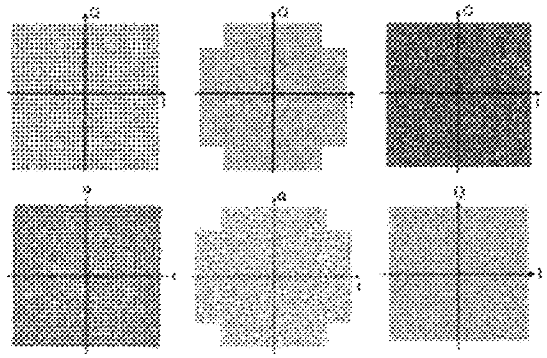
FIG. 4 illustrates an example of an MCS table and a modulation symbol constellation in a wireless communication system.

FIG. 4 illustrates an example of an MCS table and a modulation symbol constellation in a wireless communication system.

Referring to FIG. 4, an example of the MCS table and the modulation symbol constellation in the wireless communication system is described. As an MCS level table applied to IEEE802.16be standard Wi-Fi 7, an MCS level used for data transmission is changed depending on a signal environment of a wireless link, which exerts a direct influence on a data transmission amount. As illustrated, a modulation technique for a transmission symbol and a coding rate of channel coding for data transmission and reception are determined in the MCS table. The number of transmitted data bits for the modulation technique and the coding rate may be calculated as in Table 1.

TABLE 1

| | Modulation | | | |
|---|---|---|---|---|
| MCS | Order | # of Bits | Coding Rate | Tx Bits |
| 0 | BPSK | 1 | 1/2 | 0.5 |
| 1 | QPSK | 2 | 1/2 | 1.0 |

TABLE 1-continued

| | Modulation | | | |
|---|---|---|---|---|
| MCS | Order | # of Bits | Coding Rate | Tx Bits |
| 2 | QPSK | 2 | 3/4 | 1.5 |
| 3 | 16-QAM | 4 | 1/2 | 2.0 |
| 4 | 16-QAM | 4 | 3/4 | 3.0 |
| 5 | 64-QAM | 6 | 2/3 | 4.0 |
| 6 | 64-QAM | 6 | 3/4 | 4.5 |
| 7 | 64-QAM | 6 | 5/6 | 5.0 |
| 8 | 256-QAM | 8 | 3/4 | 6.0 |
| 9 | 256-QAM | 8 | 5/6 | 6.7 |
| 10 | 1024-QAM | 10 | 3/4 | 7.5 |
| 11 | 1024-QAM | 10 | 5/6 | 8.3 |
| 12 | 4096-QAM | 12 | 3/4 | 9 |
| 13 | 4096-QAM | 12 | 5/6 | 10 |

Figure 5:
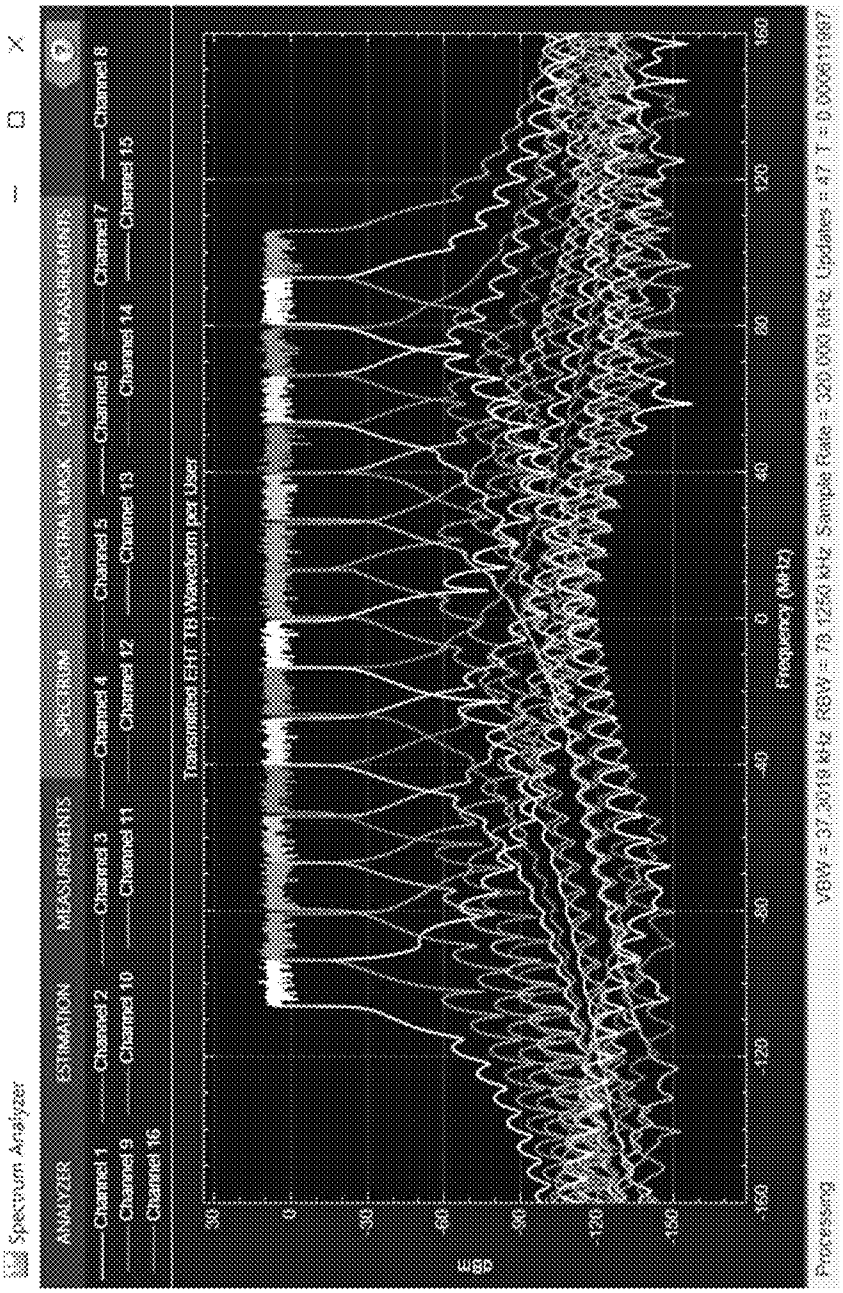
FIG. 5 illustrates an example of a resource allocation structure and multi-node resource allocation of an orthogonal frequency division multiple access system for mass data transmission and reception between distributed devices.

FIG. 5 illustrates an example of a resource allocation structure and multi-node resource allocation of an orthogonal frequency division multiple access system for mass data transmission and reception between distributed apparatuses.

Referring to FIG. 5, for real-time mass data communication between multiple nodes, the multiple access wireless link may adopt a multiple access system such s time or frequency or code or orthogonal frequency division. Here, a frequency spectrum result is illustrated when allocating 16 sub-channel resources to multiple nodes in a resource allocation structure of the Wi-Fi 7 standard orthogonal multi-access system and a single transmission channel with a 320 MHz bandwidth. A frequency spectrum result according to allocation of multiple node resources in which a total of 16 nodes may simultaneously transmit and receive data as a method in which 16 sub channels having a bandwidth of 200 MHz are allocated, and one node per sub channel transmits and receives data is illustrated.

Hereinafter, an apparatus and a method for multi-channel data signal processing based on broadband transmissions and reception according to exemplary embodiments of the present disclosure will be described with reference to FIGS. 6 to 10.

Figure 6:
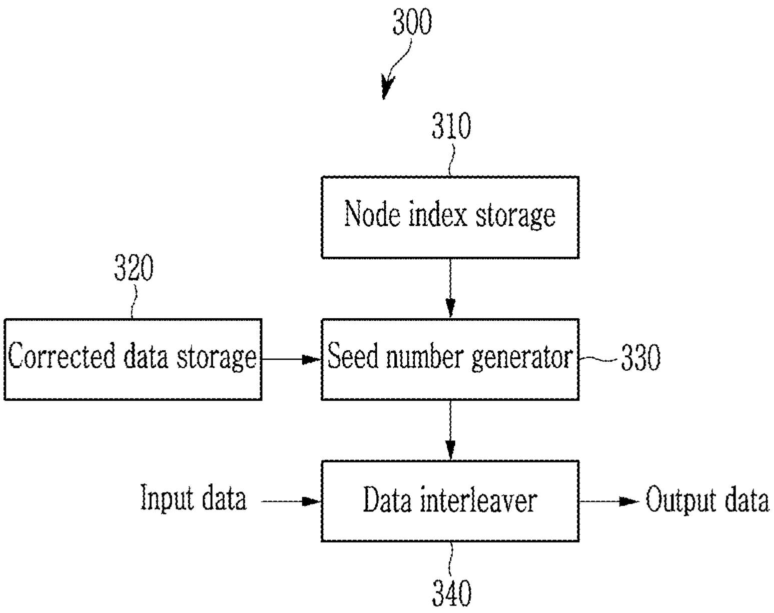
FIG. 6 is a block diagram illustrating an apparatus for multi-channel data signal processing based on broadband transmission and reception according to an exemplary embodiment of the present disclosure.
Figure 7:
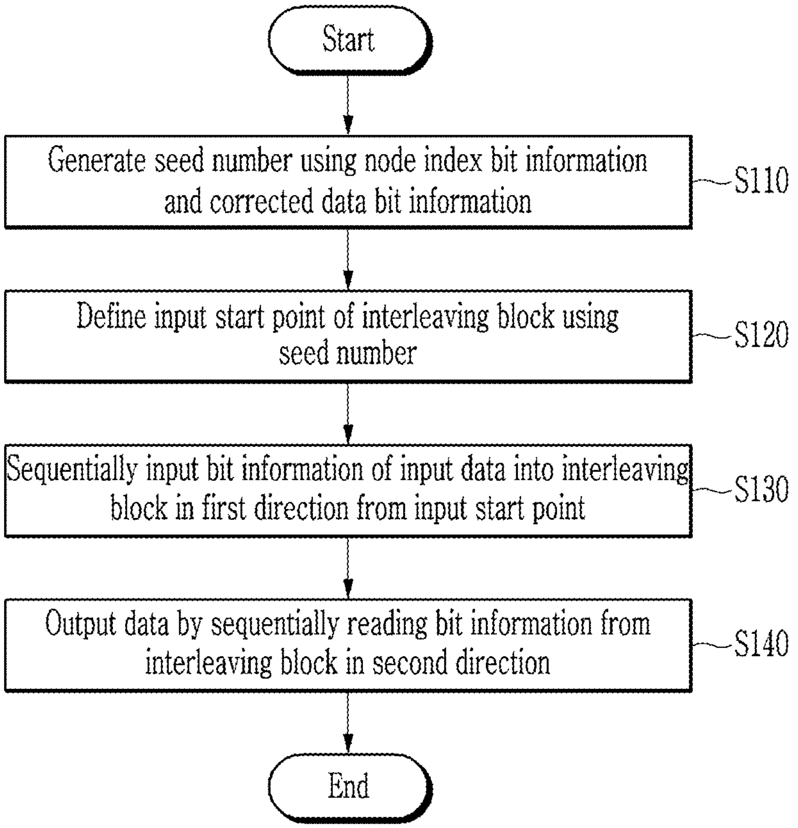
FIG. 7 is a flowchart illustrating a method for multi-channel data signal processing based on transmission and reception according to an exemplary embodiment of the present disclosure.
Figure 8:
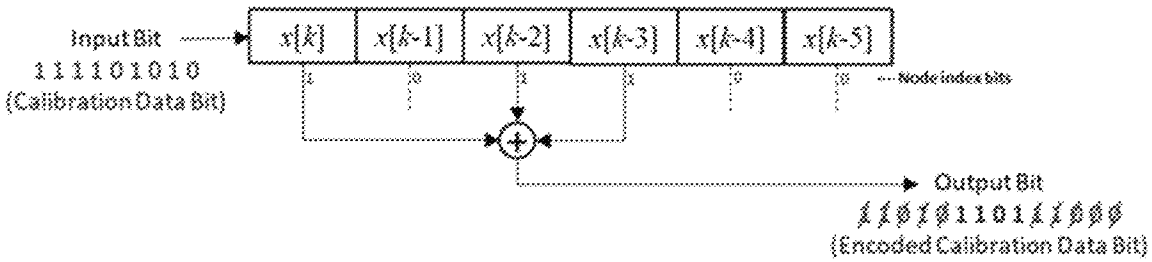
FIG. 8 is an exemplary diagram illustrating a process of generating a seed number using node index bit information and corrected data bit information according to an exemplary embodiment of the present disclosure.
Figure 9:
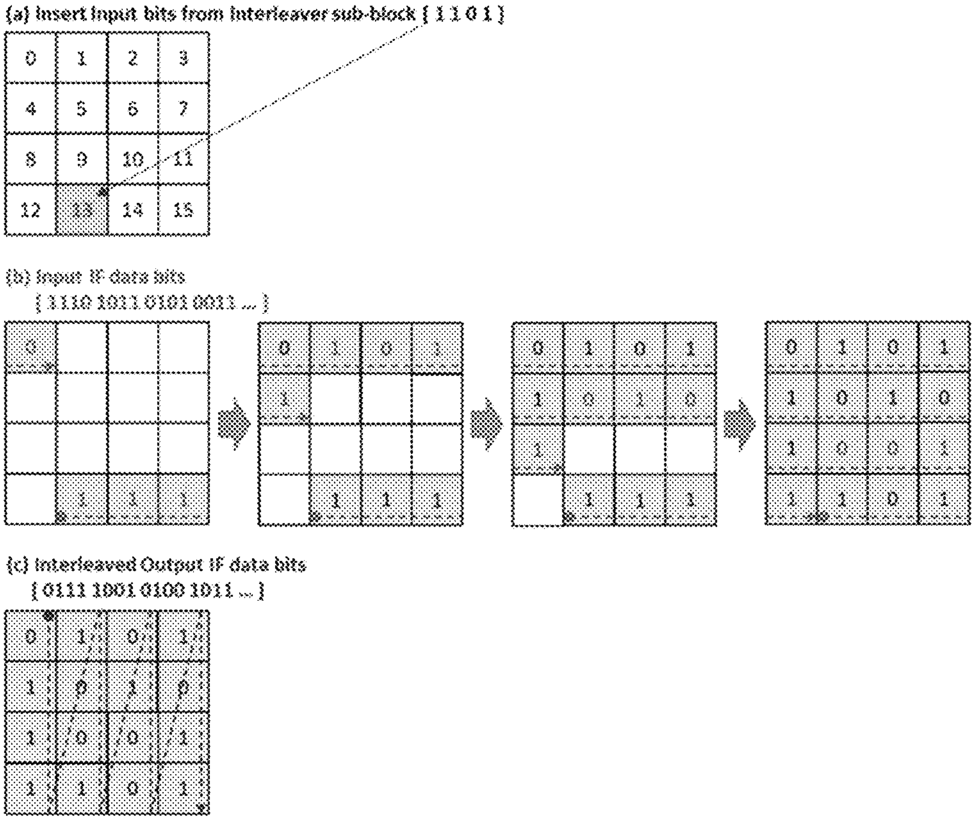
FIG. 9 is an exemplary diagram illustrating a process of defining an input start point of an interleaving block using a seed number, and outputting output data with enhanced data security through the interleaving block according to an exemplary embodiment of the present disclosure.

FIG. 6 is a block diagram illustrating an apparatus for multi-channel data signal processing based on broadband transmission and reception according to an exemplary embodiment of the present disclosure. FIG. 7 is a flowchart illustrating a method for multi-channel data signal processing based on transmission and reception according to an exemplary embodiment of the present disclosure. FIG. 8 is an exemplary diagram illustrating a process of generating a seed number using node index bit information and corrected data bit information according to an exemplary embodiment of the present disclosure. FIG. 9 is an exemplary diagram illustrating a process of defining an input start point of an interleaving block using a seed number, and outputting output data with enhanced data security through the interleaving block according to an exemplary embodiment of the present disclosure.

Referring to FIGS. 6 to 9, when a wireless link for transmitting and receiving to a large amount of data between multiple distributed devices will be applied to the existing legacy communication method such as Wi-Fi, Bluetooth, 3G, or 4G/LTE, data infringement or distortion may occur from external equipment or signals other than distributed beamforming transmission and reception, and security vulnerabilities may occur accordingly.

The data signal processing apparatus 300 and the data signal processing method according to the exemplary embodiments of the present disclosure may prevent data infringement or distortion and strengthen data complementation for each node. To this end, the data signal processing apparatus 300 may include a node index storage 310, a correction data storage 320, a seed number generator 330, and a data interleaver 340.

The node index storage 310 stores node index bit information allocated to each multiple distributed devices. That is, multiple distributed devices (e.g., slave nodes 10 of FIG. 1) may be allocated with and have different node index bit information, respectively and each node may have unique node index bit information. As an example, the node index bit information may be 6-bit information that may express 64 indexes.

The corrected data storage 320 may store the corrected data bit information of the broadband receiver 100 mounted on each of multiple distributed devices. The corrected data bit information may be information for correcting a time (phase) error which occurs in the broadband receiver 100 of each of the plurality of slave nodes 10. That is, the corrected data bit information stored in the corrected data storage 320 may be data which is the same as the corrected data applied in the delay corrector 211 described above in FIG. 3. As an example, the corrected data bit information may be 9-bit information which may correct a phase in the range of 0 to 360 degrees with a resolution of 1 degree or less.

The seed number generator 330 may perform a process of generating the seed number using the node index bit information and the corrected data bit information (S110). The seed number may be used for data interleaving. The node index bit information may determine a generative polynomial of a shift register for randomizing bit information of the seed number.

Hereinafter, as illustrated in FIG. 8, a data signal processing process will be described by taking, as an example, a case where the node index bit information is [1 0 1 1 0 0] which is node index #44, the corrected data bit information is [1 1 1 1 0 1 0 1 0], and IF data bit information is [1 1 1 0 1 0 1 1 0 1 0 1 0 0 1 1 . . . ].

The seed number generator 330 include a shift register including six states, x[k], x[k−1], x[k−2], x[k−3], x[k−4], and x[k−5], in response to 6-bit node index bit information. The seed number generator 330 may activate a branch connected to the states x[k], x[k−2], and x[k−3] of the shift register in response to the nod index bit information of [1 0 1 1 0 0]. In other words, a branch connected to a state corresponding to a bit value '1' in the node index bit information may be activated. The seed number generator 330 inputs the corrected data bit information [1 1 1 1 0 1 0 1 0] in the generative polynomial of the shift register determined by the node index bit information to obtain an output bit value (encoded corrected data bit information) [1 1 0 1 0 1 1 0 1 1 1 0 0]. The seed number generator 330 may select, as the seed number, significant bit information [1 1 0 1] computed when an input value of the corrected data bit information is used in all states of the shift register among the output bit values.

The seed number generator 330 may deliver the bit information [1 1 0 1] of the seed number to the data interleaver 340. The data interleaver 340 may perform a data signal processing process by applying a 2D interleaving technique using a two-dimensional interleaving block having a size of α×β.

As an example, in FIG. 9, a case where the data interleaver 340 applies a two-dimensional interleaving block having a size of 4×4 is illustrated. Since the bit information [1 1 0 1] of the seed number means 13, the data interleaver 340 may define, as the input start point, a 13-th block of a sequence corresponding to the bit information of the seed number in the interleaving block as illustrated in FIG. 9A.

Next, the data interleaver 340 may perform a process of sequentially inputting bit information of input data into the interleaving block in a first direction from the input start point (S130). The input data is IF data bit information [1 1 1 0 1 0 1 1 0 1 0 1 0 0 1 1 . . . ]. The first direction may be a horizontal direction corresponding to a turn direction in the interleaving block. As illustrated in FIG. 9B, the IF data bit information [1 1 1 1 0 1 1 0 1 0 1 0 1 0 1 1 . . . ] may be input sequentially from the 13-th block of the interleaving block. Here, the first direction is illustrated as the horizontal direction, but depending on the exemplary embodiment, the first direction may be a vertical direction.

Next, the data interleaver 340 may perform a process of sequentially reading the bit information in a second direction in the interleaving block, and outputting output data (S140). The output data is a converted (interleaved) IF data generated by rearranging the IF data bit information. The second direction may be a vertical direction orthogonal in the turn direction in the interleaving block. As illustrated in FIG. 90, in the interleaving block, the bit information is sequentially read in the vertical direction from a 0-th block, and output data [0 1 1 1 1 0 0 1 0 1 0 0 1 0 1 1 . . . ] may be output. Here, the second direction is illustrated as the vertical direction, but depending on the exemplary embodiment, the first direction may also be the horizontal direction.

As such, the data signal processing apparatus 300 of each of the multiple distributed devices (nodes) may randomize the seed number by using the allocated node index bit information and the corrected data bit information of the mounted broadband receiver 100, and defines the input start point of the interleaving block by using the randomized seed number, and applies data interleaving to prevent data infringement or distortion by external equipment or signals, and enhance the security.

Hereinafter, referring to FIG. 10, a method for performing the data signal processing process by applying a 3D interleaving technique using a 3D interleaving block having a size of α×β×γ will be described.

Figure 10:
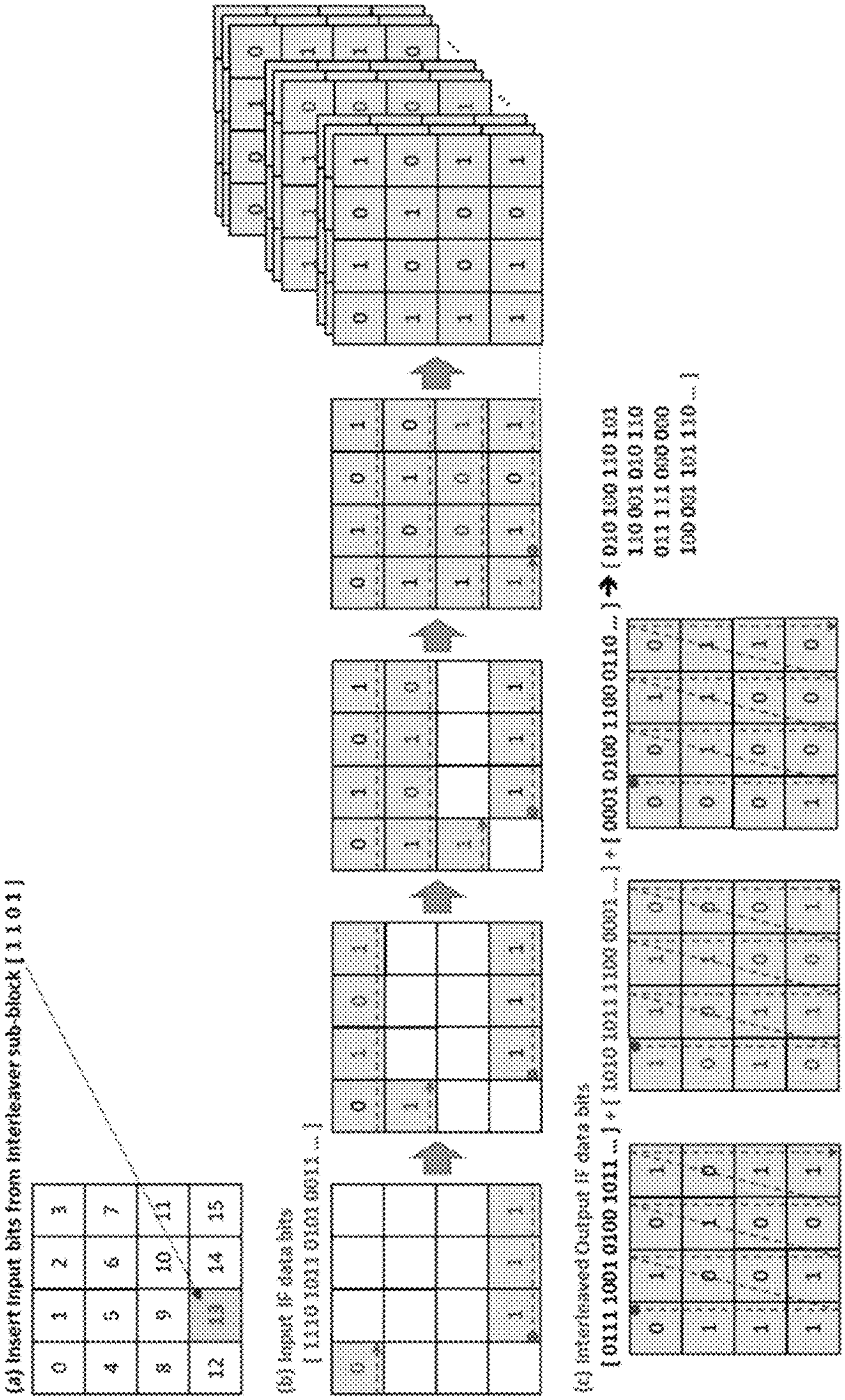
FIG. 10 is an exemplary diagram illustrating a process of defining an input start point of an interleaving block using a seed number, and outputting output data with enhanced data security through the interleaving block according to another exemplary embodiment of the present disclosure.

FIG. 10 is an exemplary diagram illustrating a process of defining an input start point of an interleaving block using a seed number, and outputting output data with enhanced data security through the interleaving block according to another exemplary embodiment of the present disclosure.

Referring to FIG. 10, the data interleaver 340 may perform the data signal processing process by applying a 3D interleaving technique using a 3D interleaving block having a size of α×β×γ. The 3D interleaving block includes multiple (Y) α×β-sized 2D interleaving blocks. When a size of bit information of input data (IF data bit information) is larger than a size of one 2D interleaving block, and corresponds to a size of multiple interleaving blocks, the data interleaver 340 may perform the data signal processing process by applying the 3D interleaving technique using multiple 2D interleaving blocks.

Hereinabove, the process (S110) in which the seed number generator 330 generates the seed number by using the node index bit information and the corrected data bit information and the process (S120) in which the data interleaver 340 defines the input start point of the interleaving block by using the seed number, which are described by referring to FIGS. 6 to 9 may be performed similarly.

Next, the data interleaver 340 may perform the process (S130) of sequentially inputting the bit information of the input data into the interleaving block in the first direction from the input start point with respect to multiple interleaving blocks.

As an example, in FIG. 10, a case where the data interleaver 340 applies a 3D interleaving block having a size of 4×4×15 (α=4, β=4, and γ=15) is illustrated The data interleaver 340 may sequentially input the IF data bit information [1 1 1 0 1 0 1 1 0 1 0 1 0 0 1 1 . . . ] from the first interleaving block to the 15-th interleaving block. At this time, as illustrated in FIG. 10B, the data interleaver 340 may sequentially input the IF data bit information [1 1 1 0 1 0 1 1 0 1 0 0 1 1 . . . ] in the first direction from the 13-th block in each interleaving block with the 13-th block corresponding to the bit information [1 1 0 1 of the seed number as the input start point in all 15 2D interleaving blocks.

Next, the data interleaver 340 may perform the process (S140) of sequentially reading the bit information in the second direction in the interleaving block, and outputting output data with respect to multiple interleaving blocks.

As illustrated in FIG. 10C, the data interleaver 340 may read the bit information in the second direction in each of multiple 2D interleaving blocks. As illustrated, bit information [0 1 1 1 1 0 0 1 0 1 00 1 01 1 . . . ] may be read sequentially in the vertical direction from the 0-th block in a first interleaving block, bit information [1 0 1 0 1 0 1 1 1 1 0 0 0 0 0 1 . . . ] may be read sequentially in the vertical direction from the 0-th block in a second interleaving block, and bit information [0 0 0 1 0 1 0 0 1 1 0 0 0 1 1 0 . . . ] may be read sequentially in the vertical direction from the 0-th block in a third interleaving block.

At this time, the data interleaver 340 divides multiple 2D interleaving blocks into multiple groups, and rearranges bit information read from 2D interleaving blocks in each group to output data. As illustrated in FIG. 10C, the data interleaver 340 may divide 15 interleaving blocks into five groups each including three interleaving blocks. In addition, one bit is read from each of three interleaving blocks in the group of the data interleaver 340, and bit information is rearranged to generate output data [0 1 0 1 0 0 1 1 0 1 0 1 1 1 0 0 0 1 0 1 0 1 1 0 0 1 1 1 1 1 0 0 0 0 0 0 0 1 0 0 0 0 1 1 0 1 1 1 0 . . . ]. In the case of an example of applying 3D interleaving which is signal-processed by three groups, a Euclidean distance of 4×4×5=80 bits may be guaranteed. A 3D interleaving block size and the number of groups may be defined by considering a data packet size.

Hereinafter, an experimental result of comparing a bit error rate performance in an additive white Gaussian noise (AWGN) wireless channel environment when the data signal processing process is performed by using the 3D interleaving technique using the 3D interleaving block with the existing interleaving technique will be described.

Figure 11:
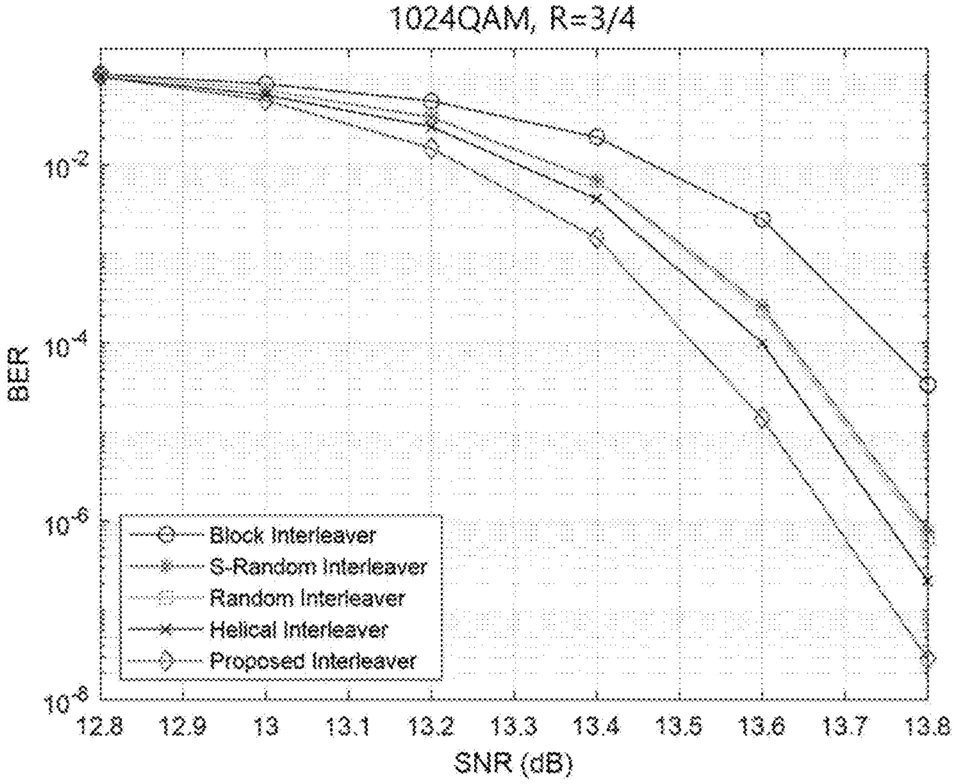
FIGS. 11 and 12 are graphs showing an experimental result of a bit error rate for a packet of applying 3D interleaving having a size of 160×160×16 to a 1024 QAM modulation scheme and a 64 QAM modulation scheme in an AWGN wireless channel environment.
Figure 12:
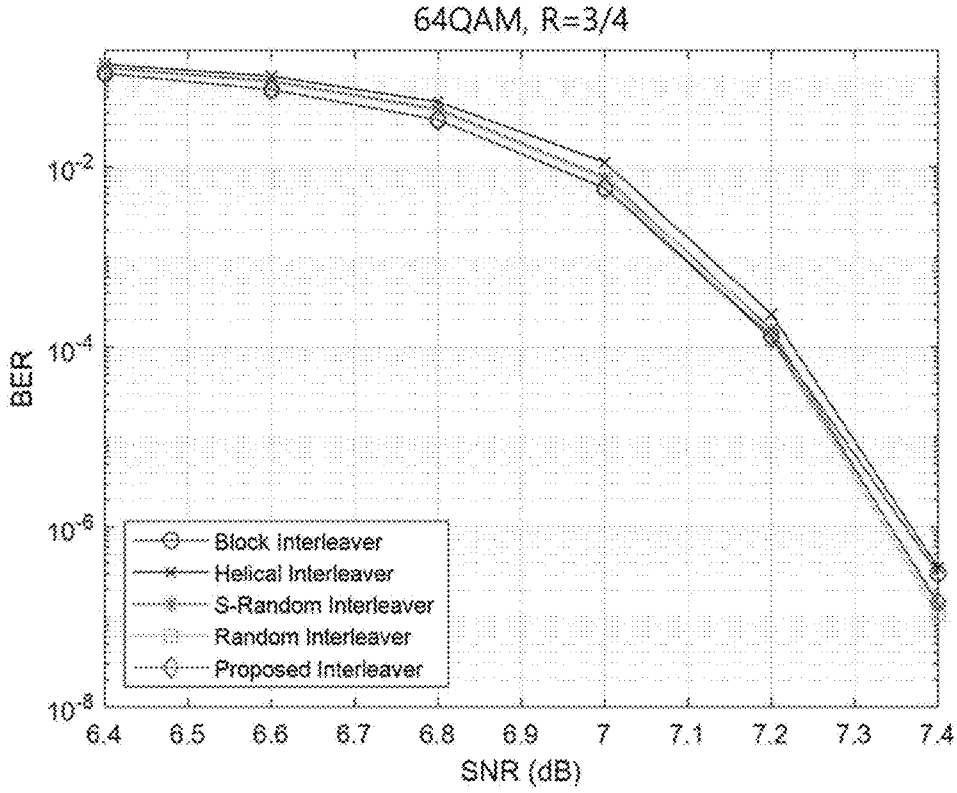

FIGS. 11 and 12 are graphs showing an experimental result of a bit error rate for a packet of applying 3D interleaving having a size of 160×160×16 to a 1024 QAM modulation scheme and a 64 QAM modulation scheme in an AWGN wireless channel environment.

Referring to FIGS. 11 and 12, in order to confirm a performance when applying the 3D interleaving of the scheme proposed according to the exemplary embodiment of the present disclosure, the corresponding performance is compared and analyzed with performances of a block interleaver, a helical interleaver, an S-random interleaver, and a random interleaver used as a general interleaving technique, and a performance according to low-density parity check (LDPC) coding to which a coding rate of R=3/4 is applied for each modulation scheme is confirmed. It can be seen that when the interleaver of the proposed scheme is applied to the 1024 QAM modulation scheme, signal to noise performance improvement of 0.1 dB compared to the performance of the helical interleaver and 0.25 dB compared to the performance of the block interleaver is shown based on a bit error rate of 0.1%, and when the interleaver of the proposed scheme is applied to the 64 QAM modulation scheme, the interleaver of the proposed scheme shows the same performance as other interleaving schemes.

Figure 13:
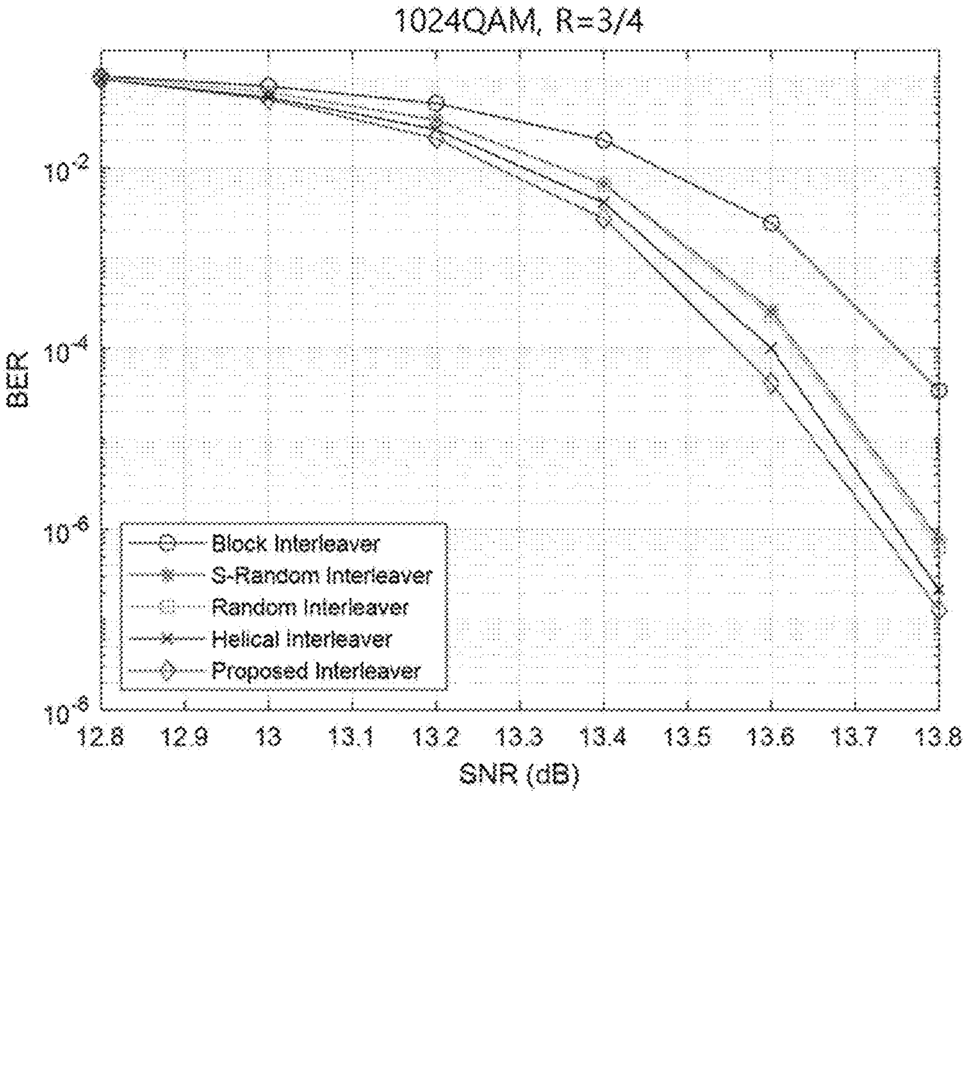
FIGS. 13 and 14 are graphs showing an experimental result of a bit error rate for a packet of applying 3D interleaving having a size of 160×160×1024 to a 1024 QAM modulation scheme and a 64 QAM modulation scheme in an AWGN wireless channel environment.
Figure 14:
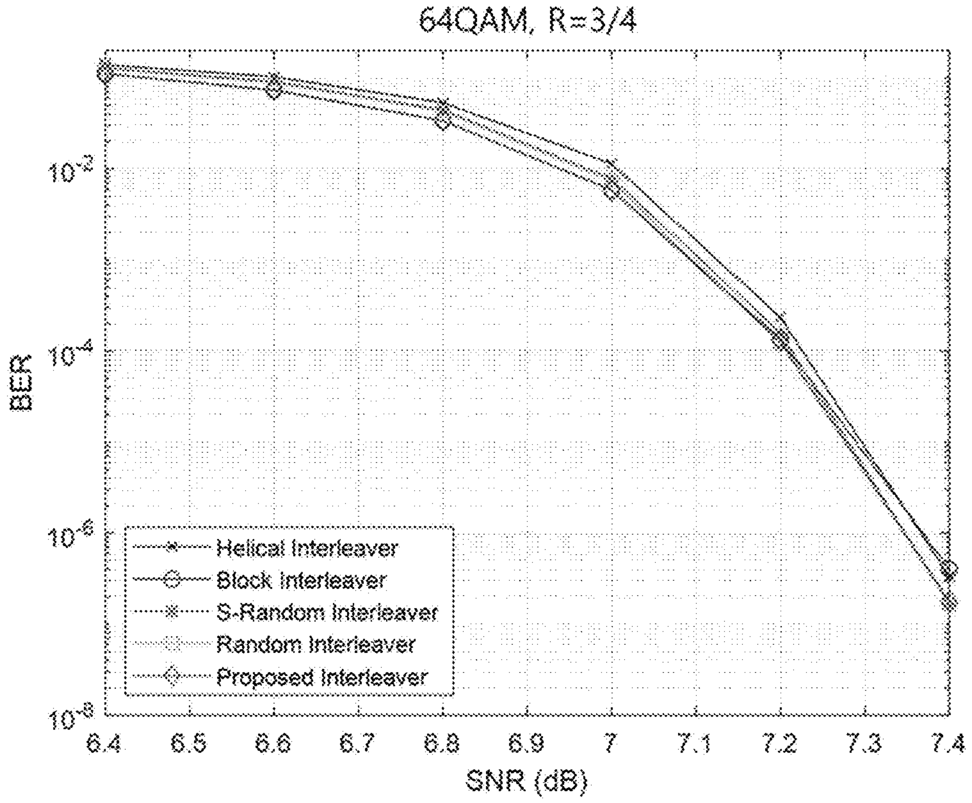

FIGS. 13 and 14 are graphs showing an experimental result of a bit error rate for a packet of applying 3D interleaving having a size of 160×160×1024 to a 1024 QAM modulation scheme and a 64 QAM modulation scheme in an AWGN wireless channel environment.

Referring to FIGS. 13 and 14, a result similar to a performance evaluation result in FIGS. 11 and 12 may be confirmed. Through such a result, it can be seen that when the 3D interleaving of the proposed scheme is applied, a higher-density modulation scheme is applied compared to the existing scheme to show an improved performance for a bitstream having a large data packet size, and it is confirmed that as the density of the modulation scheme decreases, the 3D interleaving shows a performance equal to or more than the existing scheme.

Figure 15:
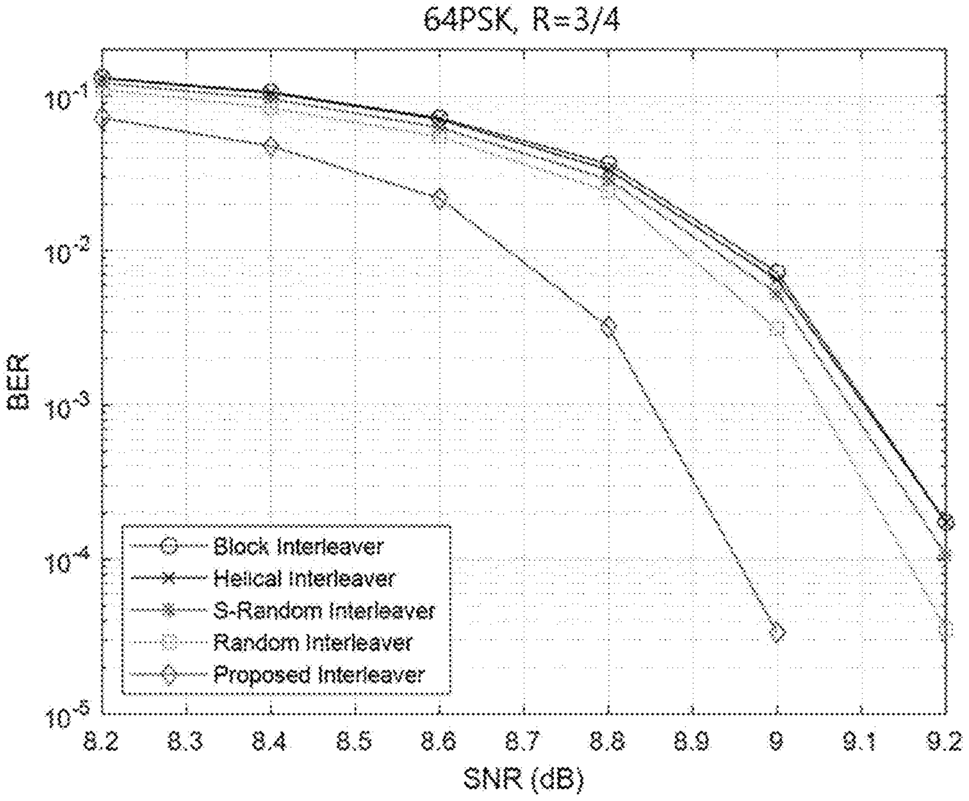
FIGS. 15 and 16 are graphs showing an experimental result of a bit error rate for a packet of applying 3D interleaving having a size of 160×160×2 upon applying LDPC R=3/4 coding rate to a 64 PSK modulation scheme and a 16 PSK modulation scheme in an AWGN wireless channel environment.
Figure 16:
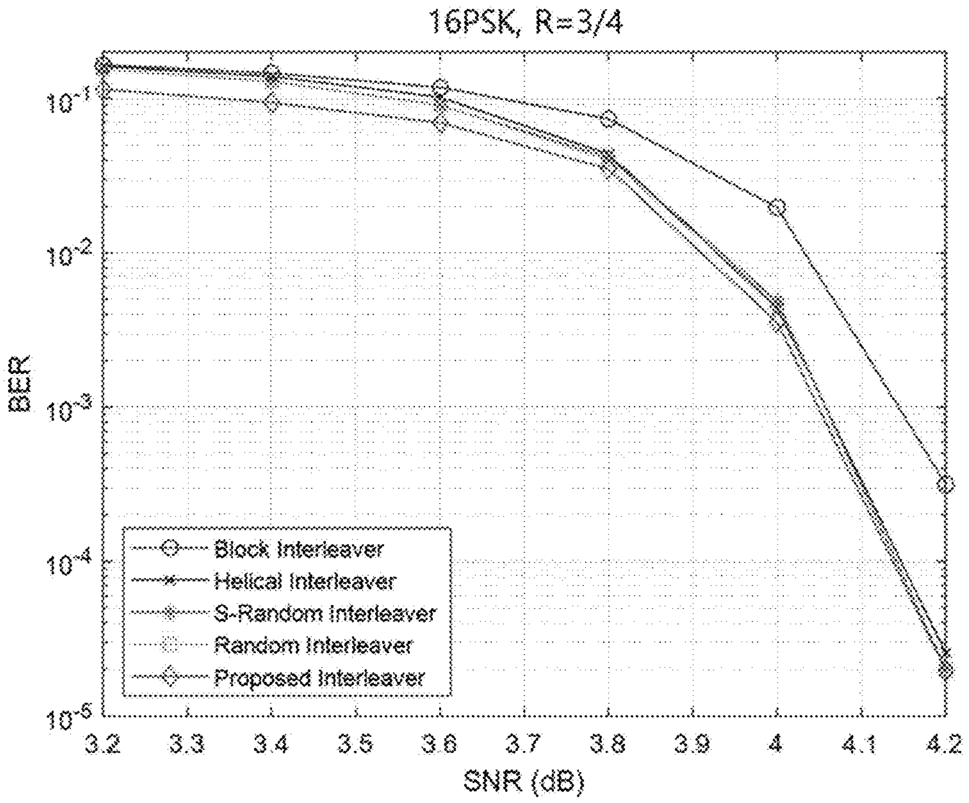

FIGS. 15 and 16 are graphs showing an experimental result of a bit error rate for a packet of applying 3D interleaving having a size of 160×160×2 upon applying LDPC R=3/4 coding rate to a 64 PSK modulation scheme and a 16 PSK modulation scheme in an AWGN wireless channel environment.

Referring to FIGS. 15 and 16, it can be seen that when the interleaver of the proposed scheme is applied to the 64 PSK modulation scheme, signal to noise ratio performance improvement of 0.2 dB compared to the performance of the random interleaver and 0.25 dB compared to the performance of the block interleaver is shown based on the bit error rate of 0.1%, and when the interleaver of the proposed scheme is applied to the 16 PSK modulation scheme, signal to noise ratio performance improvement of 0.1 dB compared to the performance of the block interleaver, and similar signal to noise ratio performance improvement to other interleaver schemes are shown.

The drawings referred and the detailed description of the present disclosure disclosed up to now are just used for exemplifying the present disclosure and they are just used for the purpose of describing the present disclosure, but not used for limiting a meaning or restricting the scope of the present disclosure disclosed in the claims. Therefore, it will be appreciated by those skilled in the art that various modifications and other exemplary embodiments equivalent thereto can be made therefrom. Accordingly, the true technical scope of the present disclosure should be defined by the technical spirit of the appended claims.

What is claimed is:

1. A data signal processing apparatus comprising:

a seed number generator generating a seed number by using node index bit information allocated to each of multiple distributed devices and corrected data bit information of a broadband receiver mounted on each of the multiple distributed devices; and a data interleaver defining an input start point of an interleaving block by using the seed number, sequentially inputting bit information of input data into the interleaving block in a first direction from the input start point, and sequentially reading bit information from the interleaving block in a second direction and outputting output data.

2. The data signal processing apparatus of claim 1, wherein:

the node index bit information determines a generative polynomial of a shift register for randomizing bit information of the seed number.

3. The data signal processing apparatus of claim 2, wherein:

the seed number generator obtains an output bit value by inputting the corrected data bit information into the generative polynomial of the shift register determined by the node index bit information, and selects, as the seed number, significant bit information computed when an input value of the corrected data bit information is used in all states of the shift register among the output bit values.

4. The data signal processing apparatus of claim 1, wherein:

the data interleaver sequentially inputs bit information of the input data from the input start point in a horizontal direction corresponding to a turn direction in a 2D interleaving block.

5. The data signal processing apparatus of claim 4, wherein:

the data interleaver sequentially reads bit information from a 0-th block in a vertical direction orthogonal to the turn direction in the 2D interleaving block to output the output data.

6. The data signal processing apparatus of claim 1, wherein:

the data interleaver sequentially inputs the bit information of the input data into each interleaving block with a block of a turn corresponding to the seed number as the input start point in all multiple 2D interleaving blocks included in a 3D interleaving block.

7. The data signal processing apparatus of claim 6, wherein:

the data interleaver divides the multiple 2D interleaving blocks into multiple groups, and rearranges bit information by reading bits from 2D interleaving blocks in each group one bit by one bit to output the output data.

8. A data signal processing apparatus performing data rearrangement in a multiple access wireless link of a wireless communication system based on broadband transmission and reception, which includes a plurality of slave nodes and one master node, comprising:

a seed number generator randomizing bit information of a seed number by using node index bit information and corrected data bit information of each node; and a data interleaver sequentially inputting bit information of input data into the interleaving block in a first direction, and outputting output data generated by rearranging the input data by reading bit information from the interleaving block in a second direction.

9. The data signal processing apparatus of claim 8, wherein:

the data interleaver defines, as an input start point, a block of a turn corresponding to bit information of the seed number in the interleaving block, and inputs the bit information of the input data into the interleaving block.

10. A data signal processing method by a data signal processing apparatus performing data rearrangement in a multiple access wireless link of a wireless communication system based on broadband transmission and reception, comprising:

generating a seed number by using node index bit information allocated to each of multiple distributed devices and corrected data bit information of a broadband receiver mounted on each of the multiple distributed devices;

defining an input start point of an interleaving block by using the seed number;

sequentially inputting bit information of input data into the interleaving block in a first direction from the input start point; and sequentially reading bit information from the interleaving block in a second direction, and outputting output data.

11. The data signal processing method of claim 10, wherein:

the node index bit information determines a generative polynomial of a shift register for randomizing bit information of the seed number.

12. The data signal processing method of claim 11, wherein:

an output bit value is obtained by inputting the corrected data bit information into the generative polynomial of the shift register determined by the node index bit information, and significant bit information computed when an input value of the corrected data bit information is used in all states of the shift register among the output bit values is selected as the seed number.

13. The data signal processing method of claim 10, wherein:

bit information of the input data is sequentially input from the input start point in a horizontal direction corresponding to a turn direction in a 2D interleaving block.

14. The data signal processing method of claim 13, wherein:

bit information is sequentially read from a 0-th block in a vertical direction orthogonal to the turn direction in the 2D interleaving block to output the output data.

15. The data signal processing method of claim 10, wherein:

the bit information of the input data is sequentially input into each interleaving block with a block of a turn corresponding to the seed number as the input start point in all multiple 2D interleaving blocks included in a 3D interleaving block.

16. The data signal processing method of claim 15, wherein:

the multiple 2D interleaving blocks are divided into multiple groups, and bit information is rearranged by reading bits from 2D interleaving blocks in each group one bit by one bit to output the output data.

17. A data signal processing method by a data signal processing apparatus performing data rearrangement in a multiple access wireless link of a wireless communication system based on broadband transmission and reception, which includes a plurality of slave nodes and one master node, comprising:

randomizing bit information of a seed number by using node index bit information and corrected data bit information of each node;

sequentially inputting bit information of input data into the interleaving block in a first direction; and sequentially outputting output data generated by rearranging the input data by reading bit information from the interleaving block in a second direction.

18. The data signal processing method of claim 17, wherein:

a block of a turn corresponding to bit information of the seed number is defined as an input start point in the interleaving block, and the bit information of the input data is input into the interleaving block.

* * * * *